Patented Aug. 30, 1932

1,874,581

UNITED STATES PATENT OFFICE

WILHELM NEELMEIER, OF LEVERKUSEN-ON-THE-RHINE, AND WILHELM LAMBERZ, OF WIESDORF, GERMANY, ASSIGNORS TO GENERAL ANILINE WORKS, INC., OF NEW YORK, N. Y., A CORPORATION OF DELAWARE

AROMATIC MONOAROYL DIAMINES

No Drawing. Application filed January 5, 1931, Serial No. 506,834, and in Germany January 15, 1930.

The present invention relates to a process of preparing monoaroyl-diamines of the benzene and naphthalene series, more particularly it relates to compounds which may be represented by the probable general formula:

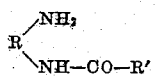

wherein R and R' stand for a benzene or naphthalene nucleus and wherein R may be substituted by alkyl, alkoxy or halogen, and R' may be substituted by alkyl, alkoxy, halogen or the nitro group.

The manufacture of monoaroyl-phenylene-diamines by reduction or aroylated nitroanilines is known. In consequence of the sparing solubility of the aroylated nitroaniline and of the reduction products in water and in the customary organic solvents, such as alcohol, benzene and the like, the process presents technical difficulties in many cases.

In accordance with the present invention monoaroyl-diamines of the benzene and naphthalene series of the above identified general formula are produced in a smooth reaction by starting with a nitroamine of the benzene or naphthalene series, sulfonating the same in the amino group in the usual manner by treating with chloro-sulfonic acid in an inert organic solvent in the presence of a tertiary base, favorably in a tertiary base which acts at the same time as solvent and acid-binding agent, such as pyridine or dimethyl-o-toluidine, then reducing the nitro group of the aromatic sulfamic acid formed in the usual manner by treating the same in aqueous solution with iron and acetic acid or formic acid. The aromatic amino-sulfamic acid thus produced is then aroylated in the amino group by treating with a benzoyl- or naphthoyl-halogenide, which may be substituted in the nuclei by halogen, alkyl alkoxy or the nitro group, in an alkaline reacting aqueous solution, and finally the sulfamic acid group is split up in the usual manner by heating with dilute mineral acid.

The whole process may be illustrated by the following scheme:

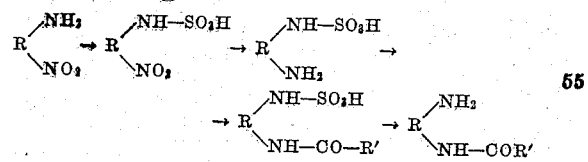

Over the processes heretofore used for the manufacture of monoaroylated diamine compounds of the benzene or naphthalene series, the present process has the advantage that apart from the first step the process can be carried out in aqueous solution due to the presence of the sulfamic acid group, and that iron which is the cheapest reducing agent can be used. The process also renders possible in many cases the manufacture of bases which in consequence of the difficulty of obtaining the nitroamine compounds could only be produced by other methods in a tedious or cumbersome manner. Thus the compounds of the formulæ:

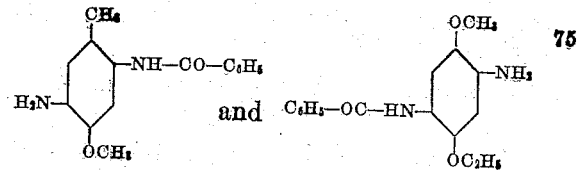

which in accordance with this invention are obtainable from the compounds of the formulæ.

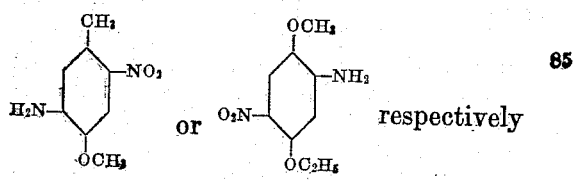

were only to be obtained from the nitroamines of the formulæ:

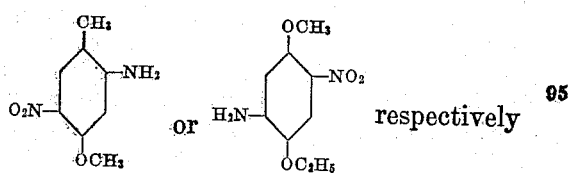

these nitroamines being obtainable only with difficulty.

The following examples will illustrate our invention, without restricting it thereto:

*Example 1.—4-amino-6-benzoylamino-1.3-dimethylbenzene*

268 kgs. of the sodium salt of 6-nitro-1.3-dimethylbenzene-4-sulfamic acid (obtained by sulfonating in the amino group of 6-nitro-4-amino-1.3-dimethylbenzene with chlorosulfonic acid in the presence of a tertiary base) are reduced in the usual manner at 60–70° C. with iron and formic acid. When the reaction is complete, the mass is rendered alkaline and the amino compound present in the solution is pressed out from the iron oxide sludge. Then there are gradually added to the filtrate at 25–30° C., with good stirring, 145 kgs. of benzoylchloride, and the mixture is kept weakly alkaline by means of sodium carbonate. Then it is heated to 70–80° C., the mixture is rendered weakly acid to Congo by means of hydrochloric acid, and, at the same time, the temperature is raised to 80–90° C. After a short time the saponification is complete, the hydrochloric acid salt of the 4-amino-6-benzoylamino-1.3-dimethylbenzene is precipitated, while still hot, in white lustrous needles, by the addition of common salt it is separated nearly quantitatively. Then after filtering by suction, it is again dissolved in hot water and filtered; the base is precipitated with sodium carbonate. White needles, melting point 176° C. Calculated on the nitroarylsulfamic acid employed the yield is 88%.

On aroylating instead of benzoylchloride for example, with the chloride of the phenylacetic acid the corresponding phenacetyl compound is obtained. White needles, melting point 177° C.

*Example 2.—5-amino-2-benzoylamino-4-cresolmethylether*

284 kgs. of 2-nitro-1-methyl-4-methoxybenzene-5-sulfamic acid (sodium salt), obtained by sulfonating in the amino group of 1-methyl-5-amino-4-methoxy-2-nitrobenzene) are reduced with iron and formic acid as described in Example 1. The reduction liquor freed from iron is aroylated with 145 kgs. of benzoyl chloride with the addition of sodium carbonate, and the sulfonic group is split off by means of dilute hydrochloric acid at 70–80° C. When the saponification is complete, the hydrochloric acid salt of 5-amino-2-benzoylamino-4-cresolmethylether separates, while still hot, in white lustrous needles, and by dissolving in hot water, filtering and precipitating with sodium carbonate, the free base is obtained. White needles, melting point 185° C. Calculated on the nitro-aroylsulfamic acid used the yield is 94%.

On employing instead of benzoylchloride for example cinnamic acid chloride or o-chlorophenoxyacetic acid chloride, the corresponding cinnamoyl base or the o-chlorophenoxyacetyl compound respectively are obtained.

(1) 5-amino-2-cinnamoylamino-4-cresolmethylether (free base) pale yellowish colored long needles of the melting point 195–196° C.

(2) 5-amino-2-(o-chlorophenoxy)-acetylamino-4-cresol-methylether (free base): white needles of the melting point 140.5° C.

*Example 3.—2-amino-5-benzoylamino-1-methoxy-4-ethoxybenzene*

314 kgs. of 1-methoxy-4-ethoxy-5-nitrobenzene-2-sulfamic acid (sodium salt) (obtained by sulfonating in the amino group of 1-methoxy-4-ethoxy-2-amino-5-nitrobenzene) are reduced as described in (Example 1), aroylated in aqueous soda solution with 145 kgs. of benzoylchloride, and the sulfonic group is saponified with hydrochloric acid. By redissolving the hydrochloric acid salt with hot water and precipitating with sodium carbonate, the free base is obtained. White needles of the melting point 117° C. Calculated on the nitroarylsulfamic acid used the yield is 80%.

*Example 4.—4-benzoylamino-1-naphthylamine*

290 kgs. of the sodium salt of 4-nitronaphthalene-1-sulfamic acid (produced by sulfonating in the amino group of 4-nitro-1-naphthylamine) are reduced as described in (Example 1), aroylated in aqueous soda solution with 145 kgs. of benzoylchloride, and the sulfonic group is split off by means of hydrochloric acid. By re-dissolving the hydrochloric acid salt with hot water and precipitating with sodium carbonate, the free base is obtained. White needles of the melting point 188° C. Calculated on the sodium salt of the 4-nitro-naphthalene-1-sulfamic acid employed the yield is 75%.

*Example 5.—2-amino-5-naphthoylamino-1-methoxybenzene*

270 kgs. of 1-methoxy-5-nitrobenzene-2-sulfamic acid (sodium salt), (produced by sulfonating in the amino group of 1-methoxy-2-amino-5-nitrobenzene), are reduced as described in (Example 1) and aroylated in aqueous soda solution by means of 200 kgs. of α-naphthoyl-chloride the sulfonic group is split off with hydrochloric acid. By re-dissolving the hydrochloric acid salt with hot water and precipitating with sodium carbonate, the free base is obtained. White prisms, melting point 191–192° C. Calculated on the sodium salt of 1-methoxy-5-nitrobenzene-2-sulfamic acid used the yield is 55%.

We claim:

1. The process which comprises sulfonating in the amino group an aromatic nitroamine of the general formula:

wherein R stands for a benzene or naphthalene nucleus which may be substituted by alkyl, alkoxy or halogen, reducing the nitro group in aqueous solution, aroylating the amino group by means of a benzoyl- or naphthoyl-halide which may be substituted by alkyl, alkoxy, halogen, or the nitro group and splitting up the sulfamic group by heating with a dilute mineral acid.

2. The process which comprises sulfonating in the amino group an aromatic nitroamine of the general formula:

wherein R stands for a benzene or naphthalene nucleus which may be substituted by alkyl, alkoxy or halogen, reducing the nitro group in aqueous solution, aroylating the amino group by means of benzoylchloride which may be substituted by alkyl, alkoxy, halogen or the nitro group and splitting up the sulfamic group by heating with a dilute mineral acid.

3. The process which comprises sulfonating in the amino group a compound of the general formula:

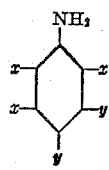

wherein one $y$ stands for a nitro group and the other $y$ and the $x$'s stand for hydrogen, alkyl, alkoxy or halogen, reducing the nitro group, benzoylating the amino group by means of benzoylchloride, and splitting up the sulfamic group by heating with a dilute mineral acid.

4. The process which comprises sulfonating in the amino group a compound of the general formula:

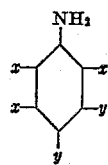

wherein one $y$ stands for a nitro group and the other $y$ and the $x$'s stand for hydrogen or for substituents of the group consisting of methyl, ethyl, methoxy and ethoxy, reducing the nitro group, benzoylating the amino group by means of benzoylchloride, and splitting up the sulfamic group by heating with a dilute mineral acid.

5. The process which comprises sulfonating in the amino group a compound of the general formula:

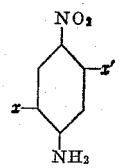

wherein $x$ and $x'$ stand for substituents of the group consisting of methyl, ethyl, methoxy, ethoxy, reducing the nitro group, benzoylating the amino group by means of benzoylchloride, and splitting up the sulfamic group by heating with a dilute mineral acid.

6. The process which comprises sulfonating in the amino group 1.3-dimethyl-4-amino-6-nitrobenzene, reducing the nitro group, benzoylating the amino group by means of benzoylchloride, and splitting up the sulfamic group by heating with a dilute mineral acid.

In testimony whereof, we affix our signatures.

WILHELM NEELMEIER.
WILHELM LAMBERZ.